United States Patent [19]

Kamata

[11] 4,438,366

[45] Mar. 20, 1984

[54] CATHODE-RAY TUBE DRIVING APPARATUS

[75] Inventor: Yasuji Kamata, Hitachi, Japan

[73] Assignee: Hitachi, Ltd., Tokyo, Japan

[21] Appl. No.: 285,734

[22] Filed: Jul. 22, 1981

[30] Foreign Application Priority Data

Jul. 23, 1980 [JP] Japan ................................ 55-99906

[51] Int. Cl.³ ............................................ H01J 23/34
[52] U.S. Cl. ........................................ 315/1; 315/3.0
[58] Field of Search ...................................... 315/1, 3

[56] References Cited

U.S. PATENT DOCUMENTS 2,465,406  3/1949  Taylor ..................................... 315/1

Primary Examiner—Harold Dixon
Attorney, Agent, or Firm—Antonelli, Terry & Wands

[57] ABSTRACT

An improved apparatus for driving a cathode-ray tube (CRT) with minimized power consumption is disclosed. In the apparatus, a voltage regulator element (a Zener diode) supplying a regulated voltage substantially equal to that voltage of the associated cathode providing a maximum image luminance is connected in series with the cathode between the driving circuit and the cathode, thereby reducing the driving voltage of the driving power source and reducing the power consumption of the CRT driving apparatus.

15 Claims, 5 Drawing Figures

CATHODE-RAY TUBE DRIVING APPARATUS

BACKGROUND OF THE INVENTION

1. Field of the Invention

This invention relates to an apparatus for driving a cathode-ray tube (which will be abbreviated hereinafter as a CRT).

2. Description of the Prior Art

A CRT is widely used in apparatus such as television receivers and display units displaying process states, patterns, characters, etc. It is well known that, in order to display an image on a CRT, a driving apparatus is required for amplifying an image input signal and generating electron beams from the cathodes (the electron guns) of the CRT. Heretofore, efforts have been made for the purpose of removing noises from the input image signal applied to the CRT driving apparatus and also for the purpose of controlling the intensity of the electron beams with high fidelity in response to the level of the input image signal applied to the CRT driving apparatus. However, no one has taken notice of the difference in the power consumption of the CRT driving apparatus due to the difference in the cathode driving characteristics in individual CRT's, and none of the prior art efforts have been directed to minimization of the total power consumed by the CRT driving apparatus.

For a better understanding of the present invention, the structure of a prior art CRT driving apparatus will be briefly described before describing the present invention in detail.

FIG. 1 shows the structure of one form of prior art CRT driving apparatus. Referring to FIG. 1, a color CRT 1 includes three cathodes K, a first grid $G_1$, a second grid $G_2$, a third grid $G_3$ and an anode A. Three driving transistors 11, each of which is connected at its collector to one end of a resistor 21, are connected at their collectors to the cathodes K respectively. The resistors 21 are connected at the other end thereof to a cathode drive power source $E_V$. The first grid $G_1$ is grounded, while the other grids $G_2$, $G_3$ and the anode A are connected to biasing power sources $E_{G2}$, $E_{G3}$ and $E_A$ respectively. There is a stray capacitor $C_s$ between the cathodes K and ground, that is, between each cathode and each of the first grid $G_1$ and the heaters (not shown).

FIG. 2 shows cathode driving characteristics in the CRT 1 of such a structure as mentioned above, by way of example. It will be seen that the characteristics A and B are different from each other, and such a difference is attributable to the manufacturing tolerance of the cathodes K of the CRT 1. When the cathode driving characteristic in the CRT 1 is represented by the curve A, it will be seen that the cathode drive voltage is 32 volts for displaying a bright image with luminance of 225 $\gamma$lx, and the voltage or the so-called cathode cutoff voltage is 73 volts for displaying a dark image with luminance of the order which can be barely sensed in a dark room or with the luminance corresponding to the so-called cutoff point. When, on the other hand, the cathode driving characteristic in the CRT 1 is represented by the curve B, it will be seen that the cathode drive voltage is 109 volts for displaying a bright image, and the cathode cutoff voltage is 159 volts.

It will be apparent from the above description that the driving circuit is required to provide various voltages from 32 volts to 159 volts since the CRT 1 includes cathodes K which may have the driving characteristic either A or B of FIG. 2, or a characteristic intermediate therebetween, when such cathodes K are to be driven from the single driving circuit. Actually, such characteristics variations are inevitable due to the manufacturing tolerance of the cathodes of CRT's. Thus, in the case of the prior art CRT driving apparatus, the cathode drive power source $E_V$ is required to provide a voltage higher than 159 volts.

On the other hand, the resistance value of each of the resistors 21 for applying the drive voltage to the respective cathodes K is limited to about 1 k$\Omega$ in order to minimize level variation of the image signal (whose frequency components range from the DC level to about 30 MHz) due to the presence of the stray capacitor $C_s$ (whose capacitance is about 10 pF).

Therefore, the prior art CRT driving apparatus has been defective in that an attempt to display an image of good quality by minimization of level variation of the image signal results in a great increase in the amount of power consumed by the resistors 21. Suppose that the voltage of the drive power source $E_V$ is 159 volts, and the resistance value $R_{21}$ of each of the resistors 21 is 1 k$\Omega$. Then, the power $P_R$ consumed by each of the resistors 21, when the cathode driving characteristic is represented by the curve A and when a bright image is displayed with $V_K = V_D = 32$ volts, is given by the following equation (1):

$$P_R = \frac{(E_V - V_D)^2}{R_{21}} \quad (1)$$

The power $P_T$ consumed by the associated transistor 11 is given by $$P_T = \frac{E_V - V_D}{R_{21}} \times V_D \quad (2)$$

Therefore, the power P consumed by one of the resistors 21 and associated transistor 11 in the driving circuit connected to the cathodes is the sum of the values provided by the equations (1) and (2) and is therefore given by $$P = P_R + P_T = \frac{E_V - V_D}{R_{21}} \cdot E_V \quad (3)$$

$$= \frac{159 \text{ (volts)} - 32 \text{ (volts)}}{1 \text{ (k}\Omega\text{)}} \cdot 159 \text{ (volts)}$$

$$\approx 20 \text{ (watts)}$$

It can thus be seen that a considerable amount of power is consumed in the prior art CRT driving circuit.

It will be added herein for reference that the CRT driving apparatus shown in FIG. 1 is illustrated in a book entitled "Color Television Textbook (Volume 1)", particularly pp. 140–142, and published by Japan Broadcasting Corporation (NHK).

SUMMARY OF THE INVENTION

It is an object of the present invention to minimize the power consumption in the CRT driving apparatus.

Another object of the present invention is to provide a CRT driving apparatus which can display an image of good quality in spite of the minimized power consumption.

Still another object of the present invention is to realize the CRT driving apparatus of the above features with a simple arrangement.

The CRT driving apparatus according to the present invention is featured by the fact that voltage regulating means for supplying a voltage which is substantially equal to that level of cathode drive voltage providing a predetermined high value of image luminance is connected in series with the associated cathode so as to lower the level of the highest driving voltage required for the CRT driving apparatus.

Other objects, features and advantages of the present invention will become apparent from the following detailed description taken in conjunction with the accompanying drawings.

DESCRIPTION OF THE PREFERRED EMBODIMENT

Figure 1:
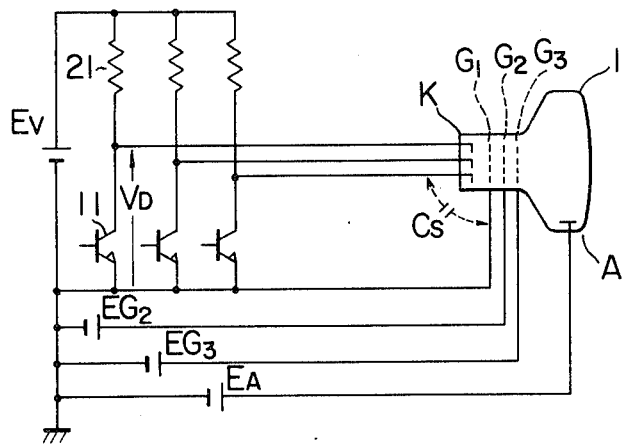
FIG. 1 is a diagrammatic view showing the structure of a prior art CRT driving apparatus.
Figure 3:
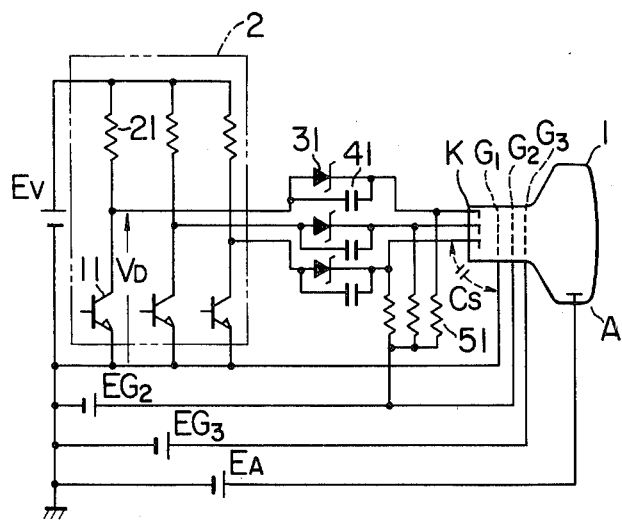
FIG. 3 is a diagrammatic view showing the structure of an embodiment of the CRT driving apparatus according to the present invention.

FIG. 3 shows the structure of an embodiment of the CRT driving apparatus according to the present invention. In FIG. 3, like reference numerals and symbols are used to designate like parts appearing in FIG. 1.

Referring to FIG. 3, cathodes K of a color CRT 1 are driven by a driving circuit 2. Although the present invention is also applicable to a CRT for black-and-white display, FIG. 3 specifically illustrates application of the present invention to a color CRT including three cathodes K. Reference numeral 31 designates Zener diodes which are employed as voltage regulator elements, by way of example. Reference numeral 41 designates bypass capacitors connected in parallel with the Zener diodes 31 respectively, and reference numeral 51 designates resistors. The driving circuit 2 includes transistors 11 and resistors 21. An image signal is applied to the bases of these transistors 11. Other symbols designate parts similar to those shown in FIG. 1.

Referring to FIG. 3, the voltage regulator elements (Zener diodes) 31 are connected in series with the cathodes K of the CRT 1 respectively and are also connected in parallel with the bypass capacitors 41, and the voltage of the biasing power source $E_{G2}$ for the second grid $G_2$ is applied through the resistors 51 to these voltage regulator elements 31.

Figure 2:
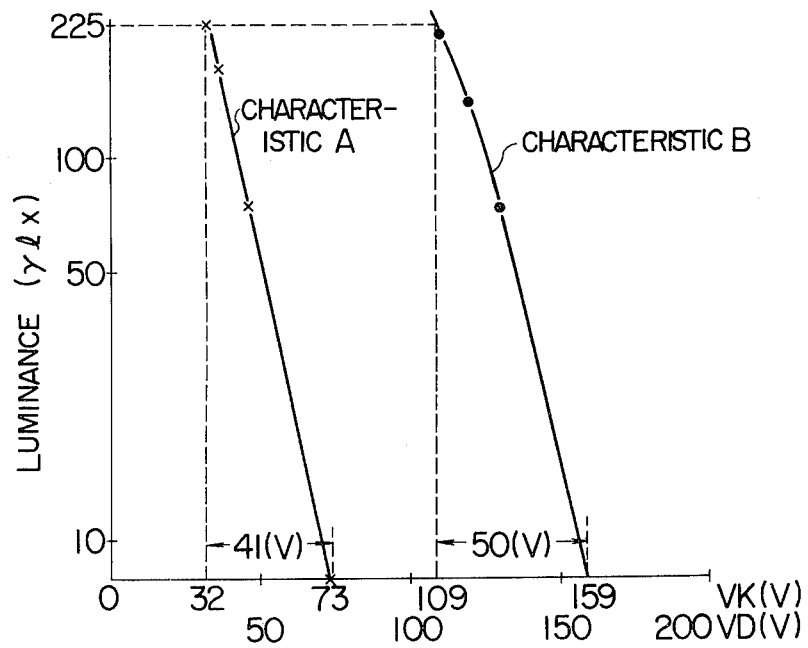
FIG. 2 is a graph for explanating the variations in cathode driving characteristic in the CRT driving apparatus shown in FIG. 1.
Figure 4:
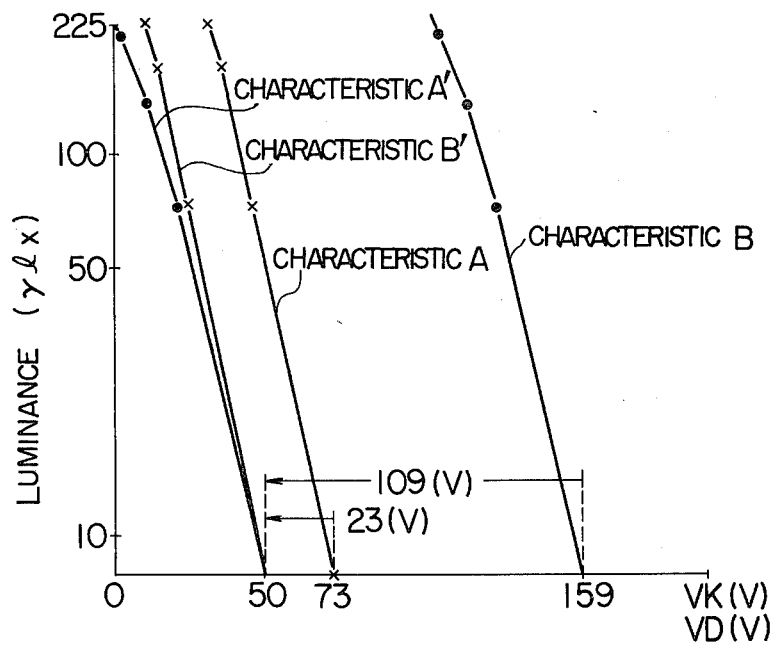
FIG. 4 shows the cathode driving characteristics for illustrating the operation of the CRT driving apparatus of the present invention.

The manner of cathode drive according to the present invention will be explained with reference to FIG. 4 in which the characteristic curves A and B are the same as those shown in FIG. 2. By the provision of the voltage regulator elements 31 shown in FIG. 3, the voltages required for driving the cathodes K, when viewed from the driving circuit 2 (hence, the collectors of the transistors 11) are shifted from those represented by the characteristic curves A and B to those represented by respective characteristic curves A' and B' as shown in FIG. 4. This is attained by selecting the setting of the voltage regulator elements 31 to be 23 volts (=73 volts minus 50 volts) when the cathode driving characteristic in the CRT 1 is represented by the curve A and by selecting the setting of the voltage regulator elements 31 to be 109 volts (=159 volts minus 50 volts) when the cathode driving characteristic is represented by the curve B. Instead of the single voltage regulator element 31 providing the regulated voltage of, for example, 23 volts, a plurality of voltage regulator elements providing, respectively, regulated voltages of 16 volts, 4 volts, 2 volts and 1 volts totaling 23 volts may be provided. The above arrangement reduces the voltage of the cathode drive source $E_V$ from the prior art value of 159 volts to 50 volts. The sum of the power $P_R$ consumed by one of the resistors 21 in the driving circuit 2, the power $P_T$ consumed by the associated transistor 11 in the driving circuit 2, the power $P_Z$ consumed by the associated voltage regulator element 31 and the power $P_{RB}$ consumed by the associated resistor 51 provides the total power P consumed by those elements in the apparatus embodying the present invention. This total power consumption P is greatly less than that given by the equation (3) described with reference to the prior art apparatus. More precisely, the total power consumption P in the embodiment of the present invention is given by $$P = P_R + P_T + P_Z + P_{RB} \qquad (4)$$

where $$P_R + P_T \approx \frac{E_V - V_D}{R_{21}} \cdot E_V$$

$$\left( \because \frac{E_{G2}}{R_{51}} << \frac{E_V}{R_{21}} \right)$$

$$P_Z \lesssim \frac{E_{G2}}{R_{51}} \cdot V_Z$$

$$P_{RB} \lesssim \frac{E_{G2}^2}{R_{51}}$$

Now, the numerical value of P will be calculated by setting the constants, by way of mere example, in the embodiment of the present invention at the following numerical values:

$E_V$ = 50 volts
$R_{21}$ = 1 kΩ
$V_Z$ = 109 volts
$R_{51}$ = 10 MΩ
$E_{G2}$ = 700 volts Then, $$P_R + P_T = \frac{50 \text{ (volts)} - 0 \text{ (volts)}}{1 \text{ (k}\Omega\text{)}} \cdot 50 \text{ (volts)} \qquad (5)$$

$$= 2.5 \text{ watts}$$

$$P_Z \lesssim \frac{700 \text{ (volts)}}{10 \text{ (M}\Omega\text{)}} \times 109 \text{ (volts)} = 0.008 \text{ watts}$$

$$P_{RB} \lesssim \frac{700 \text{ (volts)}^2}{10 \text{ (M}\Omega\text{)}} = 0.05 \text{ watts}$$

$$\therefore P \lesssim 2.6 \text{ watts}$$

From comparison between the equation (3) giving the prior art power consumption of about 20 watts and the equation (4) giving the power consumption of about 2.6 watts according to the embodiment of the present invention, it will be readily apparent that the power consumption P according to the present invention is only about 13% of the prior art value and can thus be greatly reduced.

Figure 5:
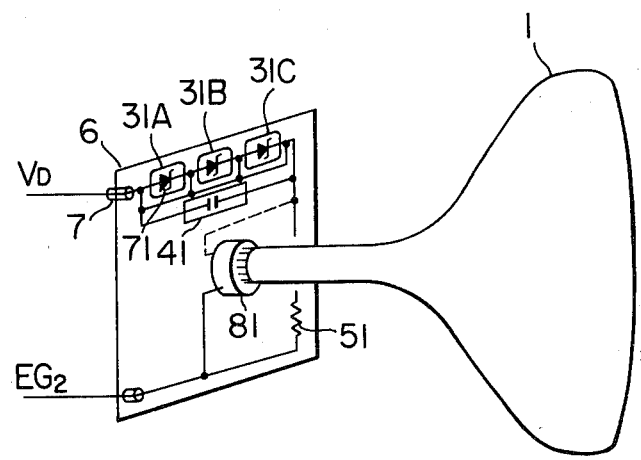
FIG. 5 shows a preferred form of mounting of the CRT driving apparatus of the present invention.

FIG. 5 shows a preferred form of mounting of the CRT driving apparatus embodying the present invention. Referring to FIG. 5, the capacitor 41, the resistor 51 and a plurality of Zener diodes 31A, 31B and 31C replacing the single voltage regulator element 31, associated with one of the cathodes K, and a socket 81 for the CRT 1 are shown mounted on a printed circuit board 6. The Zener diodes 31A, 31B and 31C are short-circuited thereacross by a printed conductor 71. The printed conductor 71 is partly or wholly cut off depending on the cutoff voltage of the associated cathode K so that the required regulated voltage can be attained. The Zener diodes 31A to 31C, the resistor 51 and the capacitor 41 are arranged to be connected to the driving circuit 2 and power source $E_{G2}$ by detachable connectors 7. According to the embodiment of the present invention, the printed conductor 71 may merely be suitably cut off to meet the characteristic of the associated cathode K of the CRT 1. Therefore, there is utterly no necessity for preparing a plurality of kinds of printed circuit boards 6, thereby achieving the standardization of the manufacturing process and contributing greatly to a reduction of manufacturing costs.

It will be appreciated that, although only an arrangement composed of Zener diodes 31A to 31C, the resistor 51 and the capacitor 41 for one of the cathode K of the CRT 1 is illustrated in FIG. 5, in the practical case such arrangements necessary for the respective cathodes K are of course provided on the same printed circuit board 6.

It will be understood from the foregoing detailed description of the present invention that voltage regulator elements functioning as biasing means are provided to reduce the voltage to be supplied from the drive power source $E_V$, so that the power consumption of the CRT driving apparatus can be greatly reduced.

What is claimed is:

1. In an apparatus for driving a cathode-ray tube which includes at least one cathode, a grid associated with said cathode, and an anode, and a power supply connected to said cathode, grid and anode, the improvement comprising voltage regulating means connected to said power supply in series with said cathode for supplying a regulated voltage of predetermined value approximately equal to the voltage of said cathode which produces a predetermined high value of image luminance in said cathode ray tube, whereby the cathode driving voltage is reduced.

2. A CRT driving apparatus as claimed in claim 1, wherein said voltage regulating means is mounted on a printed circuit board which includes a socket for the cathode of the CRT.

3. A CRT driving apparatus as claimed in claim 1 or 2, wherein said voltage regulating means includes a Zener diode.

4. A CRT driving apparatus as claimed in claim 1 or 2, wherein said voltage regulating means includes a Zener diode and a capacitor connected in parallel with said Zener diode.

5. A CRT driving apparatus as claimed in claim 1, wherein said voltage regulating means includes a plurality of series connected voltage regulator elements arranged to be short-circuited thereacross by a conductor so that said short-circuiting conductor can be partly or wholly cut off depending on the value of said regulated voltage of predetermined value to thereby provide a required regulated voltage.

6. A CRT driving apparatus as claimed in claim 1, wherein said voltage regulating means includes a plurality of series connected voltage regulator elements mounted on a printed circuit board and arranged to be short-circuited thereacross by a conductor printed on said printed circuit board so that said short-circuiting printed conductor can be partly or wholly cut off depending on the value of said regulated voltage of predetermined value to thereby provide a required regulated voltage.

7. A CRT driving apparatus as claimed in claim 5 or 6, wherein each of said voltage regulator elements is a Zener diode.

8. A CRT driving apparatus as claimed in claim 5 or 6, wherein each of said voltage regulator elements includes a Zener diode and a capacitor connected in parallel with said Zener diode.

9. An apparatus for driving a cathode-ray tube including at least one cathode, a grid associated with said cathode and an anode, the apparatus comprising a cathode drive power source, means connected to said power source for controlling a cathode drive voltage to be applied to said cathode for displaying images with various luminances, and voltage regulating means connected in series between said cathode drive power source and said cathode for producing a voltage thereacross having the same polarity as that of the voltage of said cathode drive power source in the series connection and having an amplitude substantially equal to that cathode drive voltage which will provide a predetermined high level of image luminance in said cathode ray tube.

10. A CRT driving apparatus as claimed in claim 9, wherein said voltage regulating means includes a Zener diode.

11. A CRT driving apparatus as claimed in claim 9, wherein said voltage regulating means includes a Zener diode and a capacitor connected in parallel with said Zener diode.

12. A CRT driving apparatus as claimed in claim 9, wherein said voltage regulating means includes a plurality of series connected voltage regulator elements arranged to be short-circuited thereacross by a conductor so that said short-circuiting conductor can be partly or wholly cut off depending on the value of the cathode drive voltage which provides said predetermined high level of image luminance to thereby provide a required regulated voltage.

13. A CRT driving apparatus as claimed in claim 9, wherein said voltage regulating means includes a plurality of series connected voltage regulator elements mounted on a printed circuit board and arranged to be short-circuited thereacross by a conductor printed on said printed circuit board so that said short-circuiting printed conductor can be partly or wholly cut off depending on the value of the cathode drive voltage which provides said predetermined high level of image luminance to thereby provide a required regulated voltage.

14. A CRT driving apparatus as claimed in claim 13, wherein each of said voltage regulator elements is a Zener diode.

15. A CRT driving apparatus as claimed in claim 13, wherein each of said voltage regulator elements includes a Zener diode and a capacitor connected in parallel with said Zener diode.

* * * * *